(12) United States Patent
Kuda

(10) Patent No.: US 9,911,027 B2
(45) Date of Patent: Mar. 6, 2018

(54) FINGERPRINT AUTHENTICATION SYSTEM, FINGERPRINT AUTHENTICATION PROGRAM AND FINGERPRINT AUTHENTICATION METHOD

(71) Applicant: Yasuhiro Kuda, Tokyo (JP)

(72) Inventor: Yasuhiro Kuda, Tokyo (JP)

(73) Assignee: Yasuhiro Kuda, Tokyo (JP)

( * ) Notice: Subject to any disclaimer, the term of this patent is extended or adjusted under 35 U.S.C. 154(b) by 23 days.

(21) Appl. No.: 14/903,991

(22) PCT Filed: Aug. 10, 2015

(86) PCT No.: PCT/JP2015/004013
§ 371 (c)(1),
(2) Date: Jan. 8, 2016

(87) PCT Pub. No.: WO2016/047025
PCT Pub. Date: Mar. 31, 2016

(65) Prior Publication Data
US 2017/0262691 A1   Sep. 14, 2017

(30) Foreign Application Priority Data

Sep. 24, 2014 (JP) .................................. 2014-194094
Mar. 26, 2015 (JP) ..................... PCT/JP2015/001715

(51) Int. Cl.
G06K 9/00 (2006.01)
(52) U.S. Cl.
CPC ..... G06K 9/00087 (2013.01); G06K 9/00926 (2013.01)
(58) Field of Classification Search
CPC ....................... G06K 9/00087; G06K 9/00926
See application file for complete search history.

(56) References Cited

U.S. PATENT DOCUMENTS 5,841,888 A * 11/1998 Setlak .................. A61B 5/1172
382/124

FOREIGN PATENT DOCUMENTS

EP   1 288 844 A2   3/2003
JP   H5-61964 A   3/1993
(Continued)

OTHER PUBLICATIONS

Dharchaudhuri, "Indexing of Large Biometric Database", 2010, Department of Computer Science and Engineering, National Institute of Technology, Rourkela, 48 pages.*

(Continued)

*Primary Examiner* — David F Dunphy
(74) *Attorney, Agent, or Firm* — Fitch Even Tabin & Flannery LLP

(57) ABSTRACT

An object of the present invention is to provide a fingerprint authentication system, a fingerprint authentication program and a fingerprint authentication method that can achieve high-speed processing.

A fingerprint authentication system includes a plurality of stages (n+1 stages) of indexes, a registration part in which fingerprint data FD is registered as fingerprint data TFD according to the indexes, and a checking device that checks the fingerprint data FD against the registered fingerprint data TFD based on the indexes. The fingerprint data TFD can be classified into groups, the processing speed can be increased even if there is a large number of pieces of fingerprint data TFD registered.

14 Claims, 12 Drawing Sheets

(56) References Cited

FOREIGN PATENT DOCUMENTS

| | | |
|---|---|---|
| JP | 2003-58889 A | 2/2003 |
| JP | 2006-277415 A | 10/2006 |
| JP | 2009-164680 A | 7/2009 |
| JP | 2011-86130 A | 4/2011 |
| JP | 2012-8821 A | 1/2012 |
| JP | 2012-519928 A | 8/2012 |
| WO | 2010/104885 A1 | 9/2010 |

OTHER PUBLICATIONS

International Search Report dated Oct. 27, 2015 for PCT/JP2015/004013 and English translation of the same. (4 pages).
Written Opinion dated Oct. 27, 2015 for PCT/JP2015/004013. (6 pages).

* cited by examiner

FINGERPRINT AUTHENTICATION SYSTEM, FINGERPRINT AUTHENTICATION PROGRAM AND FINGERPRINT AUTHENTICATION METHOD

CROSS-REFERENCE TO RELATED APPLICATIONS

This application is a U.S. National Phase Patent Application of International Patent Application Number PCT/JP2015/004013, filed on Aug. 10, 2015, which claims priority of Japanese Patent Application Number 2014-194094, filed Sep. 24, 2014, and of International Application Number PCT/JP2015/001715, filed on Mar. 26, 2015, which are hereby incorporated herein by reference in their entirety.

TECHNICAL FIELD

The present invention relates to a fingerprint authentication system, a fingerprint authentication program and a fingerprint authentication method.

BACKGROUND ART

Research and development of various fingerprint authentication systems have been conducted. Current fingerprint authentication systems are based on a "pattern (image) matching process", a "minutia process", a "minutia and relation process" or a "frequency analysis process", for example.

The "pattern matching process" is to specify a particular limited area of a fingerprint and check the pattern of ridges in the area by fingerprint image superposition.

The "minutia process" is to extract and register information on 20 to 30 end points or branch points of ridges in a captured fingerprint image and perform checking based on the information.

The "minutia and relation process" is to regard a fingerprint as matching with another fingerprint only when both of a minutia and relation information agree with each other between the two fingerprints.

The "frequency analysis process" is to regard a cross section of a slice of the pattern of ridges and grooves of a fingerprint as a waveform and uses the waveform spectral series as feature information to perform checking based on the maximum correlation.

In addition, Patent Literature 1 (Japanese Patent Laid-Open No. 2011-86130) discloses speed-up of an authentication process performed by a fingerprint authentication system used by a large number of users. The fingerprint authentication system that speeds up the authentication process described in the Patent Literature 1 is a fingerprint authentication system having a plurality of fingerprint sensors that comprises group identification means that identifies a group to which fingerprint data belongs according to the fingerprint sensor to which the fingerprint data is input in a fingerprint data input processing, registration means that registers the input fingerprint data in a storage device in association with the group identified by the group identification means in a fingerprint data registration processing, and checking means that checks the input fingerprint data against the fingerprint data associated with the same group as the input fingerprint data of the fingerprint data registered in the storage device in a fingerprint data authentication processing.

In addition, Patent Literature 2 (Japanese Patent Laid-Open No. 2009-164680) discloses a radio communication terminal that has an advanced security function that permits only a plurality of particular terminal users registered in advance to use the radio communication terminal, and a terminal user identification method.

The radio communication terminal described in Patent Literature 2 is a radio communication terminal provided with a PTT switch that comprises a fingerprint reading part provided in the PTT switch, a storage part in which fingerprint data for a plurality of terminal users and ID number information including at least user ID numbers set for the terminal users whose fingerprint data is registered can be registered, a fingerprint authentication part that checks fingerprint data read by the fingerprint reading part against the fingerprint data registered in the storage part, means of making the radio communication terminal operate according to the checking result from the fingerprint authentication part, and means of acquiring one piece of ID number information from the storage part based on the checking result from the fingerprint authentication part.

In addition, Patent Literature 3 (Japanese Patent Laid-Open No. 2006-277415) discloses a registration device of a fingerprint authentication system based on a difference in physical characteristics between users. The registration device described in Patent Literature 3 comprises an input part to which biological information on a registration target is input, an advance extraction part that extracts first feature data from the biological information in a predetermined feature extraction method, a classification part that determines classification data for classifying the biological information as any of a plurality of groups based on the first feature data, a feature extraction part that extracts second feature data from the biological information in a corresponding one of feature extraction methods specified for the plurality of groups, and a registration part in which the first feature data, the second feature data and the classification data are registered in association with each other as reference biological information.

CITATION LIST

Patent Literature

[Patent Literature 1]
  Japanese Patent Laid-Open No. 2011-86130
[Patent Literature 2]
  Japanese Patent Laid-Open No. 2009-164680
[Patent Literature 3]
  Japanese Patent Laid-Open No. 2006-277415

SUMMARY OF INVENTION

Although the techniques described in Patent Literatures 1 to 3 can perform fingerprint checking for a predetermined number of people, the techniques have a problem that the processing time increases as the number of pieces of registered fingerprint data increases. There is another problem that the user has to input the group information in the technique described in Patent Literature 1 or the ID number or other information in the technique described in Patent Literature 2. With the technique described in Patent Literature 1 or 2, there is a problem that fingerprint authentication fails if the user forgets the group information or the ID number.

An object of the present invention is to provide a fingerprint authentication system, a fingerprint authentication program and a fingerprint authentication method that can achieve a high-speed processing. The existing techniques disclosed in the patent literatures are approaches to reduce the processing time of a population under a particular algorithm. To the contrary, according to the present invention, factors that are to be sub-divided in a population and an algorithm that distinguishes those factors are found in the population, and an search term is changed to keep the processing time constant independently of the population.

Another object of the present invention is to provide a fingerprint authentication system, a fingerprint authentication program and a fingerprint authentication method that can achieve high-speed processing regardless of the number of pieces of fingerprint data.

(1)

A fingerprint authentication system according to an aspect comprises a plurality of stages of indexes, and a registration part in which fingerprint data is registered according to the indexes, and the registration part creates a plurality of fingerprint data groups according to the indexes and, if the number of pieces of fingerprint data registered in any individual one of the plurality of fingerprint data groups is greater than a predetermined number, changes the stages of indexes to keep the number of pieces of fingerprint data registered in each of the plurality of fingerprint data groups equal to or less than the predetermined number.

In this case, a plurality of stages of indexes is provided. For example, if a first stage includes three types of indexes, and a second stage includes three types of indexes, the number of pieces of fingerprint data registered in each group of the registration part can be reduced to an average of 11.1%.

More specifically, 100% of fingerprint data can be grouped into three groups each including approximately 33.3% of the fingerprint data according to the indexes in the first stage, and the approximately 33.3% of the fingerprint data can be further grouped into three groups each including approximately 11.1% of the fingerprint data according to the indexes in the second stage. In this way, the fingerprint data can be advantageously grouped in the registration part.

In addition, the indexes are formed in a changed manner so that each fingerprint data group contains a predetermined number or less of pieces of fingerprint data. As a result, compared with a case where all the registered fingerprint data are used for checking or the like, the access speed can be increased to reduce the processing load since only the fingerprint data registered in part of the groups is used.

(2)

The fingerprint authentication system according to a second invention is the fingerprint authentication system according to the one aspect in which, when the registration part changes the stages of indexes, the registration part may reconfigure the order of indexes so as to reduce a correlation between an index in a higher stage and an index in a lower stage.

In this case, when the registration part changes the stages of indexes, the registration part may reconfigure the order of indexes so as to reduce a correlation between an index in a higher stage and an index in a lower stage. That is, if it is determined that the fingerprint data are not smoothly classified by the index in the higher stage and the index in the lower stage, for example, if one group contains 50% or more of the fingerprint data in the determination for the index in the higher stage or the index in the lower stage, the order of indexes may be reconfigured by interchanging the index in the higher stage and the index in the lower stage, by replacing the index in the lower stage with another index so that the another index follows the index in the higher stage, or replacing the index in the higher stage with another index so that the index in the lower stage follows the another index. In this way, the number of pieces of fingerprint data in each group can be reduced.

(3)

The fingerprint authentication system according a third invention is a fingerprint authentication system according to the one aspect or the second invention in which, when the registration part changes the stages of indexes, the registration part may change a threshold of a condition for the indexes.

In this case, when the registration part changes the stages of indexes, the registration part may change a threshold of a condition for the indexes. That is, if one of the groups contains a large number of pieces of fingerprint data, the threshold for an index can be changed to reduce the number of the pieces of fingerprint data in the one group.

(4)

The fingerprint authentication system according to a fourth invention is the fingerprint authentication system according to the one aspect or the second or third invention in which, when the registration part changes the stages of indexes, the registration part may increase the number of the stages of indexes and create, as an index, a condition that equally divides a condition for an index in a higher stage.

In this case, in the increased number of stages, a condition that equally divides the condition for the index in the higher stage is created as an index. Therefore, the number of pieces of fingerprint data can be classified into a plurality of groups with reliability. In this way, the number of pieces of fingerprint data in each group can be reduced.

(5)

The fingerprint authentication system according to a fifth invention is the fingerprint authentication according to the one aspect in which, when the registration part increases the number of the stages of indexes, the registration part creates, as an index, a condition that equally divides the number of pieces of fingerprint data in a relevant fingerprint data group based on a deviation of the relevant fingerprint data group.

In this case, for the increment stage, as an index, a condition is created that equally divides the number of pieces of fingerprint data in the relevant fingerprint data group based on the deviation of the relevant fingerprint data group. Therefore, the fingerprint data can be equally classified into a plurality of groups with reliability. In this way, the number of pieces of fingerprint data in each group can be reduced, and formation of an excessive stage can be prevented.

(6)

The fingerprint authentication system according a sixth invention is the fingerprint authentication system according to any one of the one aspect and the second to fifth invention in which the indexes may be based on a characteristic or feature of the fingerprint data.

In this case, since the indexes are based on a characteristic or feature of the fingerprint data, the fingerprint data can be grouped according to the characteristic or feature of the fingerprint data.

(7)

The fingerprint authentication system according to a seventh invention is the fingerprint authentication system according to any of the one aspect and the second to sixth invention in which the index may include a pattern of ridges and grooves of the fingerprint data.

The fingerprint authentication data can be generally classified into at least three types of patterns of ridges and grooves of the fingerprint, LOOP, WHORL and ARCH, which can be advantageously used as an index.

(8)

A fingerprint authentication system according to an eighth invention is the fingerprint authentication system according to any of the one aspect and the second to seventh inventions in which the index may include at least any of the number of lines, the interval between lines and the angle of a line concerning at least any of a short line, a bar line, a hair line and an island line of the fingerprint data.

The fingerprint data can be generally classified according to the number of lines, the interval between lines or the angle of a line concerning at least any of a short line, a bar line, a hair line and an island line, which can be advantageously used as an index.

(9)

A fingerprint authentication system according to a ninth invention is the fingerprint authentication system according to any of the one aspect and the second to eighth inventions in which the index may include at least any of a branch point, an end point, a point, a start point and a joint point of the fingerprint data.

The fingerprint data can be classified according to at least any of a branch point, an end point, a point, a start point and a joint point, which can be advantageously used as an index.

(10)

A fingerprint authentication system according to another aspect comprises a plurality of stages of indexes, a registration part in which fingerprint data is registered according to the indexes, and a checking part that checks the fingerprint data based on the indexes, and the registration part creates a plurality of fingerprint data groups according to the indexes and, if the number of pieces of fingerprint data registered in any individual one of the plurality of fingerprint data groups is greater than a predetermined number, changes the stages of indexes to keep the number of pieces of fingerprint data registered in each of the plurality of fingerprint data groups equal to or less than the predetermined number. The order of the indexes in the stages is determined by computing by machine learning an efficient combination of indexes for the data groups at the point in time. Therefore, the order of precedence of the indexes in the stages is appropriately changed for each data group. For example, FingerCode is used in the first grouping for a fingerprint having a core at the center thereof, or angles at branch points are used in the first grouping for a fingerprint having many branch points.

In this case, the indexes are configured in a plurality of stages. For example, if a first stage includes three kinds of indexes, and a second stage includes three kinds of indexes, the number of pieces of fingerprint data registered in each group in the registration part can be reduced to 11.1% of all the fingerprint data on average.

The checking part checks the fingerprint data to be checked against only 11.1% of registered fingerprint data having passed through the plurality of stages. Therefore, the checking part can complete the checking of the fingerprint data in a short time.

In particular, if n stages of indexes (n represents a positive integer) are formed, even a population containing several hundreds, or tens, of millions of pieces of fingerprint data can be divided by the indexes into groups containing only several thousands of pieces of fingerprint data, and the checking process requires checking against only the several thousands of pieces of fingerprint data. Therefore, checking duration can be reduced.

(11)

A fingerprint authentication system according to an eleventh invention is the fingerprint authentication system according to another aspect in which the checking part may perform checking of the fingerprint data in a final stage of the plurality of stages in at least any of a frequency analysis process, a hybrid process, a minutia process and a pattern matching process.

In this case, the checking part performs only the checking of the fingerprint data in the final stage of the plurality of stages in any of the frequency analysis process, the hybrid process, the minutia process and the pattern matching process, which are computationally intensive. Therefore, the checking speed can be improved, and the process load can be minimized.

(12)

A fingerprint authentication program according to another aspect comprises an indexing processing configured in a plurality of stages, and a registration processing of registering fingerprint data according to the indexing processing, and the registration processing creates a plurality of fingerprint data groups according to the indexing processing and, if the number of pieces of fingerprint data registered in any individual one of the plurality of fingerprint data groups is greater than a predetermined number, changes the stages of the indexing processing to keep the number of pieces of fingerprint data registered in each of the plurality of fingerprint data groups equal to or less than the predetermined number.

In this case, a plurality of stages of index processing is provided. For example, if a first stage includes three types of indexes, and a second stage includes three types of indexes, the number of pieces of fingerprint data registered in each group in the registration processing can be reduced to an average of 11.1%.

More specifically, 100% of fingerprint data can be grouped into three groups each including approximately 33.3% of the fingerprint data according to the index processing in the first stage, and the approximately 33.3% of the fingerprint data can be further grouped into three groups each including approximately 11.1% of the fingerprint data according to the indexes in the second stage. In this way, the fingerprint data in the registration part can be advantageously grouped.

In addition, the indexes are formed in a changed manner so that each fingerprint data group contains a predetermined number or less of pieces of fingerprint data. As a result, compared with a case where all the registered fingerprint data are used for checking or the like, the access speed can be increased to reduce the processing load since only the fingerprint data registered in part of the groups is used.

(13)

A fingerprint authentication program according to another aspect comprises an indexing processing configured in a plurality of stages, a registration processing of registering fingerprint data according to the indexing processing, and a checking processing of checking the fingerprint data based on the indexing processing, and the registration processing creates a plurality of fingerprint data groups according to the indexing processing and, if the number of pieces of fingerprint data registered in any individual one of the plurality of fingerprint data groups is greater than a predetermined number, increases the number of the stages of the indexing processing to keep the number of pieces of fingerprint data registered in each of the plurality of fingerprint data groups equal to or less than the predetermined number.

In this case, a plurality of stages of index processing is provided. For example, if a first stage includes three types of indexes, and a second stage includes three types of indexes, the number of pieces of fingerprint data registered in each group in the registration processing can be reduced to an average of 11.1%.

More specifically, 100% of fingerprint data can be divided into groups each containing about 33.3% of fingerprint data and registered in the indexing processing in the first stage, and the about 33.3% of fingerprint data can be divided into groups each containing about 11.1% of fingerprint data in the indexing processing in the second stage. In this way, the fingerprint data can be efficiently grouped in the registration processing.

In addition, the indexes are formed in a changed manner so that each fingerprint data group contains a predetermined number or less of pieces of fingerprint data. As a result, compared with a case where all the registered fingerprint data are used for checking or the like, the access speed can be increased to reduce the processing load since only the fingerprint data registered in part of the groups is used.

In particular, if n stages of indexes are provided (n represents a positive integer), even if there are hundreds or tens of millions of pieces of fingerprint data, the checking process requires only thousands of pieces of registered fingerprint data grouped according to the indexes, so that the time required for the checking process can be reduced.

(14)

A fingerprint authentication method according to another aspect comprises an indexing step configured in a plurality of stages, and a registration step of registering fingerprint data according to the indexing step, and the registration step creates a plurality of fingerprint data groups according to the indexing step and, if the number of pieces of fingerprint data registered in any individual one of the plurality of fingerprint data groups is greater than a predetermined number, changes the stages of the indexing step to keep the number of pieces of fingerprint data registered in each of the plurality of fingerprint data groups equal to or less than the predetermined number.

In this case, the indexing step is configured in a plurality of stages. For example, if a first stage includes three kinds of indexes, and a second stage includes three kinds of indexes, the number of pieces of fingerprint data registered in each group in the registration step can be reduced to 11.1% of all the fingerprint data on average.

More specifically, 100% of fingerprint data can be divided into groups each containing about 33.3% of fingerprint data according to the indexes in the first stage and registered, and the about 33.3% of fingerprint data can be divided into groups each containing about 11.1% of fingerprint data according to the indexes in the second stage. In this way, the fingerprint data can be efficiently grouped in the registration step.

In addition, the indexes are formed in a changed manner so that each fingerprint data group contains a predetermined number or less of pieces of fingerprint data. As a result, compared with a case where all the registered fingerprint data are used for checking or the like, the access speed can be increased to reduce the processing load since only the fingerprint data registered in part of the groups is used.

(15)

A fingerprint authentication method according to another aspect comprises an indexing step configured in a plurality of stages, a registration step of registering fingerprint data according to the indexing step, and a checking step of checking the fingerprint data based on the indexing step, and the registration step creates a plurality of fingerprint data groups according to the indexes and, if the number of pieces of fingerprint data registered in any individual one of the plurality of fingerprint data groups is greater than a predetermined number, changes the stages of the indexes to keep the number of pieces of fingerprint data registered in each of the plurality of fingerprint data groups equal to or less than the predetermined number.

In this case, the indexing step is configured in a plurality of stages. For example, if a first stage includes three kinds of indexes, and a second stage includes three kinds of indexes, the number of pieces of fingerprint data registered in each group in the registration step can be reduced to 11.1% of all the fingerprint data on average.

More specifically, 100% of fingerprint data can be grouped into three groups each including approximately 33.3% of the fingerprint data according to the indexes in the first stage, and the approximately 33.3% of the fingerprint data can be further grouped into three groups each including approximately 11.1% of the fingerprint data according to the indexes in the second stage. In this way, the fingerprint data in the registration step can be advantageously grouped.

In addition, the indexes are formed in a changed manner so that each fingerprint data group contains a predetermined number or less of pieces of fingerprint data. As a result, compared with a case where all the registered fingerprint data are used for checking or the like, the access speed can be increased to reduce the processing load since only the registered fingerprint data registered in part of the groups is used in the checking step.

In particular, if n stages of indexes are provided (n represents a positive integer), even if there are hundreds or tens of millions of pieces of fingerprint data, the checking process requires only thousands of pieces of registered fingerprint data grouped according to the indexes, so that the time required for the checking process can be reduced.

REFERENCE SIGNS LIST

Figure 1:
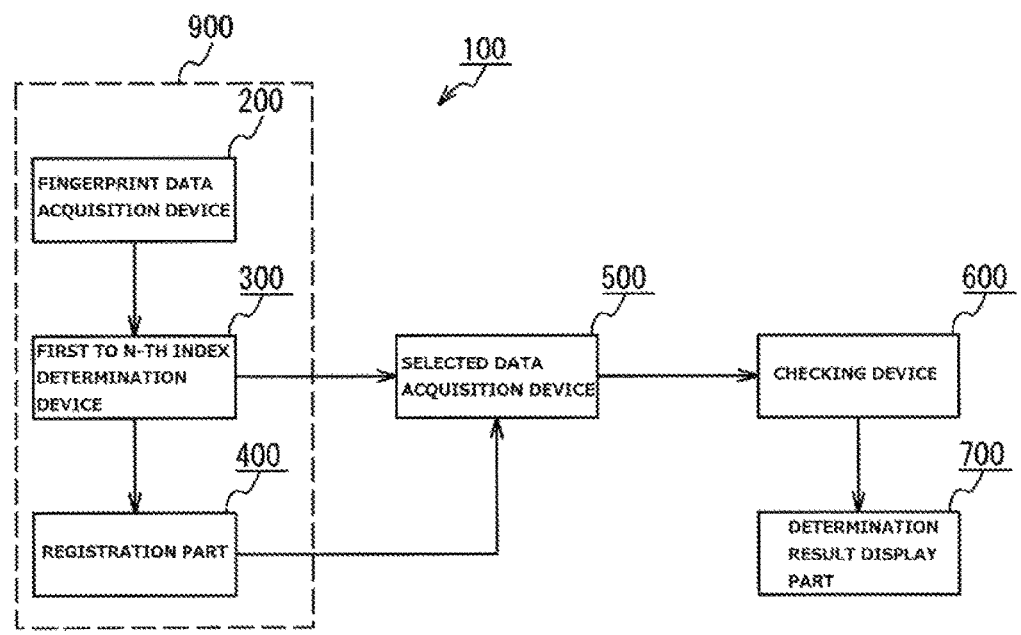
FIG. 1 is a schematic diagram showing an example of a schematic configuration of a fingerprint authentication system according to an embodiment.

100 fingerprint authentication system
331-33P n-th index determination unit 400 registration part
600 checking device
FD, TFD fingerprint data

DESCRIPTION OF EMBODIMENT

In the following, an embodiment of the present invention will be described with reference to the drawings. In the following description, the same components are denoted by the same reference numerals. The same components also have the same names and the same functions, so that detailed description thereof will not be repeated.

Embodiment (Fingerprint Authentication System 100)

FIG. 1 is a schematic diagram showing an example of a schematic configuration of a fingerprint authentication system 100.

As shown in FIG. 1, the fingerprint authentication system 100 includes a fingerprint data acquisition device 200, a first to n-th index determination device 300, a registration part 400, a selected data acquisition device 500, a checking device 600 and a determination result display part 700.

(Fingerprint Registration Process)

First, a fingerprint registration process will be described.

A fingerprint registration apparatus 900 is used for the fingerprint registration process. The fingerprint registration apparatus 900 includes the fingerprint data acquisition device 200, the first to n-th index determination device 300 and the registration part 400.

First, the fingerprint data acquisition device 200 acquires fingerprint data FD. The fingerprint data acquisition device 200 provides the acquired fingerprint data FD to the first to n-th index determination device 300.

The first to n-th index determination device 300 makes a determination on the fingerprint data FD based on a plurality of stages of indexes described later. The first to n-th index determination device 300 provides index information (referred to as index data, hereinafter) associated with the fingerprint data FD to the registration part 400. The registration part 400 registers the fingerprint data FD as fingerprint data TFD in a group corresponding to the index data. The "group" will be described later.

(Fingerprint Checking Process)

Next, a fingerprint checking process will be described. The fingerprint authentication system 100 is used for the fingerprint checking process.

More specifically, for the fingerprint checking process, the fingerprint data acquisition device 200, the first to n-th index determination device 300, the registration part 400, the selected data acquisition device 500, the checking device 600 and the determination result display part 700 are used.

In the fingerprint checking process, the fingerprint data acquisition device 200 acquires fingerprint data FD. The fingerprint data acquisition device 200 provides the acquired fingerprint data FD to the first to n-th index determination device 300.

The first to n-th index determination device 300 make a determination on the fingerprint data FD based on the plurality of stages of indexes described later. The first to n-th index determination device 300 extracts the index data from the fingerprint data FD for the determination. The first to n-th index determination device 300 provides the index data to the selected data acquisition device 500.

The selected data acquisition device 500 extracts the registered fingerprint data TFD corresponding to the index data from the registration part 400 based on the index data.

The selected data acquisition device 500 provides the fingerprint data TFD extracted from the registration part 400 and the fingerprint data FD from the fingerprint data acquisition device 200 to the checking device 600.

The checking device 600 performs pattern matching between the fingerprint data TFD extracted from the registration part 400 and the fingerprint data FD from the fingerprint data acquisition device 200, and provides the determination result to the determination result display part 700.

The determination result display part 700 displays the determination result on an incorporated display part (not shown).

Although the display part incorporated in the determination result display part 700 has been described above, the present invention is not limited thereto, and the fingerprint authentication system 100 may have a signal output part that outputs a signal indicative of the determination result.

(Example of Fingerprint Registration Device)

Figure 2:
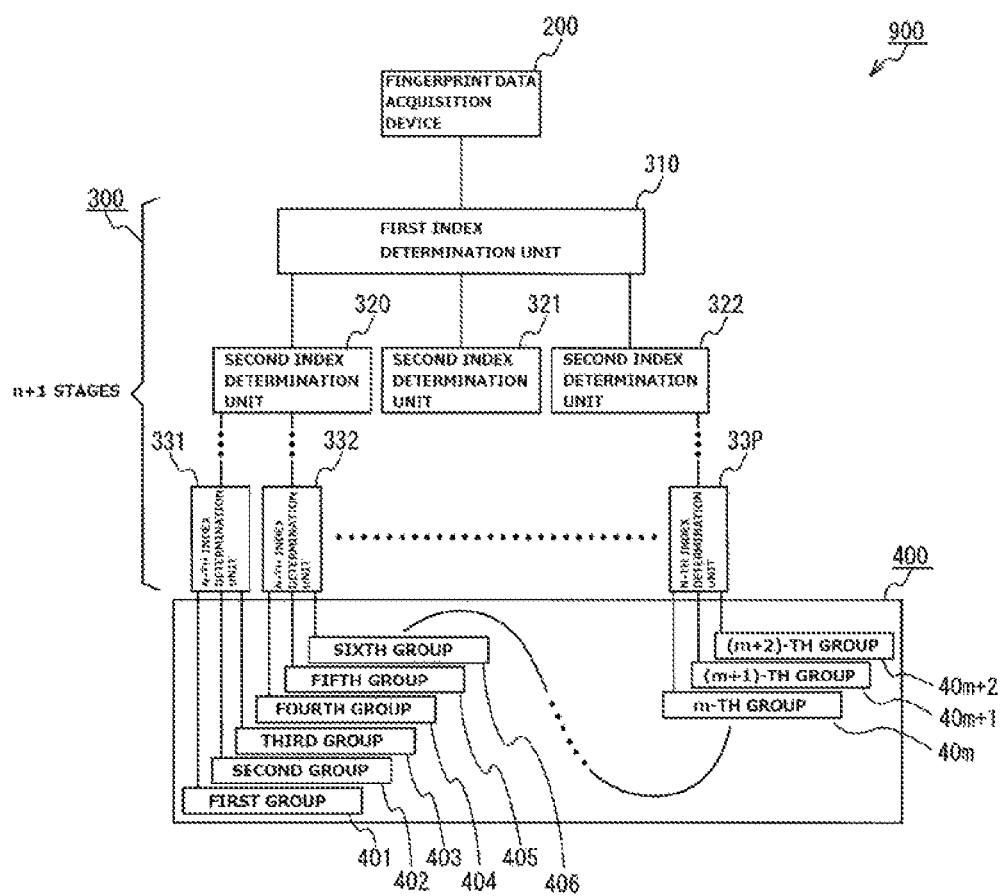
FIG. 2 is a schematic diagram showing an example of a fingerprint registration device.

FIG. 2 is a schematic diagram showing an example of a fingerprint registration device. As shown in FIG. 2, the first to n-th index determination device 300 comprises n+1 stages of index determination units (n represents a positive integer).

For example, a first index determination unit 310 receives the fingerprint data FD from the fingerprint data acquisition device 200, classifies the fingerprint data FD into three classes, and transmits the fingerprint data FD according to the classification.

More specifically, the first index determination unit 310 can generally classify the fingerprint data FD into three classes, LOOP, WHORL and ARCH, based on the features or characteristics of the fingerprint data FD. These classes will be described in detail later.

As shown in FIG. 2, second index determination units 320, 321 and 322 are provided below the first index determination unit 310.

Furthermore, n-th index determination units 331 and 332 are provided below the second index determination unit 320.

Similarly, a plurality of n-th index determination units (not shown) are provided below the second index determination unit 321, and an n-th index determination unit 33P is provided below the second index determination unit 332 (P represents a positive integer).

In this way, the first to n-th index determination device 300 comprises a plurality of stages (n+1 stages) of index determination units.

As shown in FIG. 1, the first to n-th index determination device 300 is provided with the registration part 400. As shown in FIG. 2, the registration part 400 has a plurality of groups, from a first group 401 to (m+2)-th group 40$m$+2 (m represents a positive integer).

The first group 401, a second group 402 and a third group 403 of the registration part 400 are provided below the n-th index determination unit 331.

Similarly, a fourth group 404, a fifth group 405 and a sixth group 406 are provided below the n-th index determination unit 332.

Similarly, an m-th group 40$m$, a (m+1)-th group 40$m$+1 and the (m+2)-th group 40$m$+2 are provided below the n-th index determination unit 33P.

(Flowchart of Operation of Fingerprint Registration Process)

Figure 3:
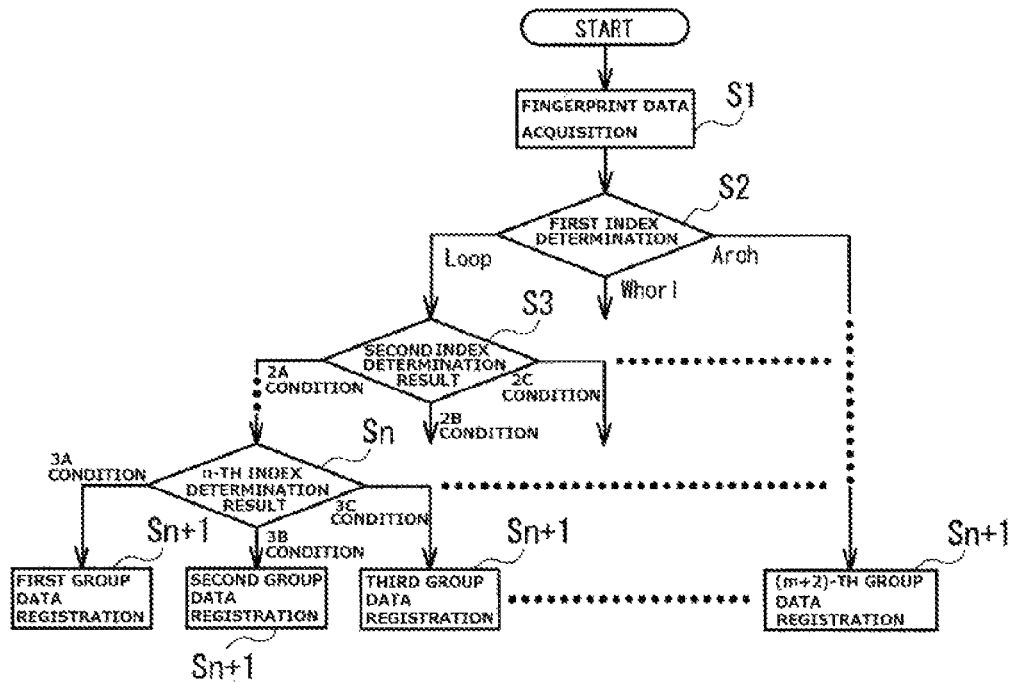
FIG. 3 is a flowchart showing an operation of a fingerprint registration process according to this embodiment.
Figure 4:
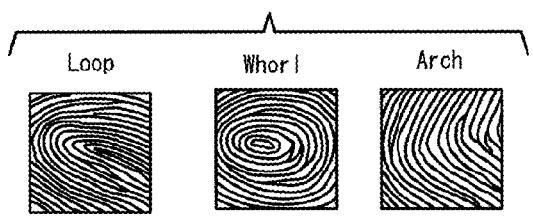
FIG. 4 is a schematic diagram for illustrating LOOP, WHORL and ARCH of fingerprint data.
Figure 5:
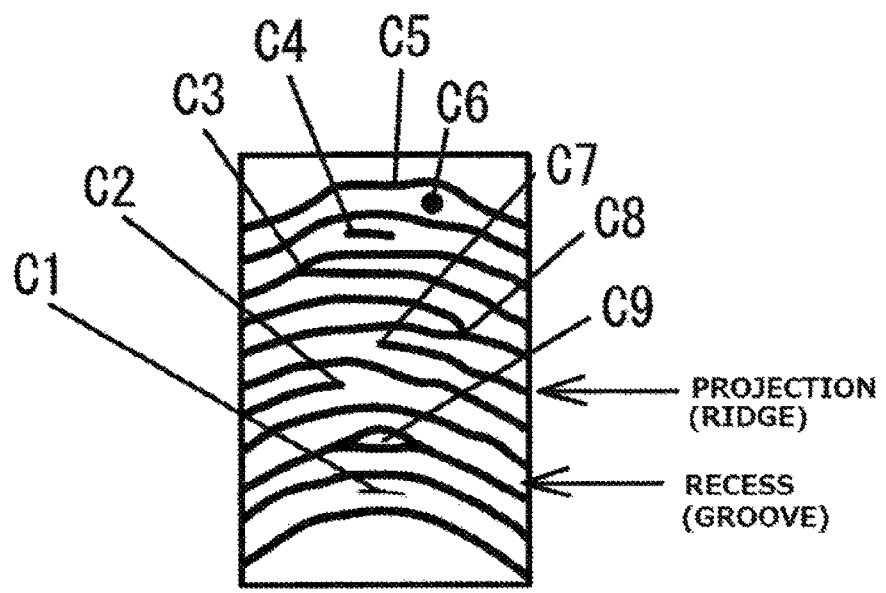
FIG. 5 is a schematic diagram for illustrating an example of characteristics or features of the fingerprint data.

FIG. 3 is a flowchart of an operation of the fingerprint registration process according to this embodiment. FIG. 4 is a schematic diagram for illustrating LOOP, WHORL and ARCH concerning the fingerprint data, and FIG. 5 is a schematic diagram for illustrating an example of features or characteristics of the fingerprint data.

As shown in FIG. 3, in the fingerprint registration process, the fingerprint data acquisition device 200 acquires fingerprint data FD (Step S1).

Then, the fingerprint data acquisition device 200 transmits the acquired fingerprint data FD to the first index determination unit 310, and the first index determination unit 310 determines as which class, LOOP, WHORL or ARCH, the fingerprint data FD is classified (Step S2).

As shown in FIG. 4, the fingerprint data FD is classified as LOOP when the fingerprint has a pattern of loops, is classified as WHORL when the fingerprint has a pattern of circles, and is classified as ARCH when the fingerprint has a pattern of arches.

In the processing of Step S2, the first index determination unit 310 determines as which class the fingerprint data FD is classified.

For example, if it is determined in the processing of Step S2 that the fingerprint data is classified as LOOP, the second index determination unit 320 further determines which condition, a 2A condition, a 2B condition or a 2C condition, the fingerprint data FD satisfies, based on the characteristics or features of the fingerprint data FD (Step S3).

As shown in FIG. 5, in the fingerprint data FD, a projection in a skin cross section appears as a ridge, and a recess appears as a groove. As shown in FIG. 5, the fingerprint data FD has a hair line C1, an end point C2, a branch point C3, a short line C4, a bar line C5, a point C6, a start point C7, a joint point C8, an island line C9 and the like as features or characteristics.

The hair line C1 is a ridge having a thickness equal to or smaller than a half of a predetermined value, the short line C4 is a ridge having length smaller than 5 mm, the bard line C5 is a ridge having a length equal to or greater than 5 mm, and the point C6 is a ridge whose thickness and length are equal to each other.

In the processing of Step S3, the second index determination unit 320 sets a condition that the number of bar lines is less than 30 as the 2A condition, a condition that the number of bar lines is equal to or more than 30 and less than 70 as the 2B condition, and a condition that the number of bar lines is equal to or more than 70 as the 2C condition, for example, and determines which condition the fingerprint data FD satisfies.

If it is determined in the processing of Step S3 that the fingerprint data FD satisfies the 2A condition, the n-th index determination unit 331 determines whether or not the fingerprint data FD satisfies a predetermined condition (Step Sn).

The n-th index determination unit 331 registers the fingerprint data FD in the first group 401 as the fingerprint data TFD if the fingerprint data FD satisfies a 3A condition, registers the fingerprint data FD in the second group 402 as the fingerprint data TFD if the fingerprint data FD satisfies a 3B condition, and registers the fingerprint data FD in the third group 403 as the fingerprint data TFD if the fingerprint data FD satisfies a 3C condition (Step Sn+1).

In this way, the fingerprint registration apparatus 900 eventually classifies the fingerprint data FD into the first to (m+2)-th groups and registers the classified fingerprint data FD as the fingerprint data TFD. As a result, the number of pieces of fingerprint data TFD registered in each of the first to (m+2)-th groups can be reduced. For example, when hundreds of millions of pieces of fingerprint data FD are to be registered, the number of pieces of fingerprint data TFD registered in each group can be reduced to several thousands or less by using dozens of stages of index data.

(Flowchart of Operation of Fingerprint Checking Process)

Figure 6:
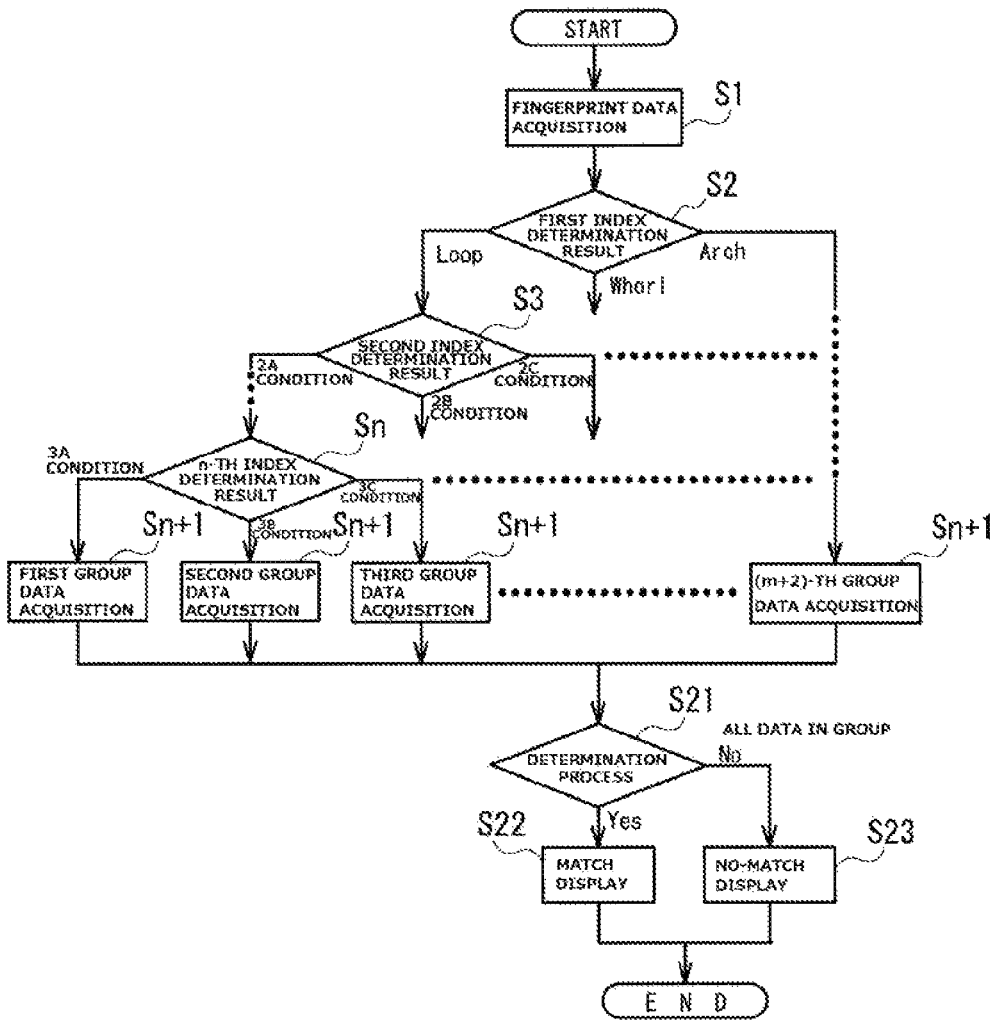
FIG. 6 is a flowchart showing an operation of a fingerprint checking process according to this embodiment.
Figure 7:
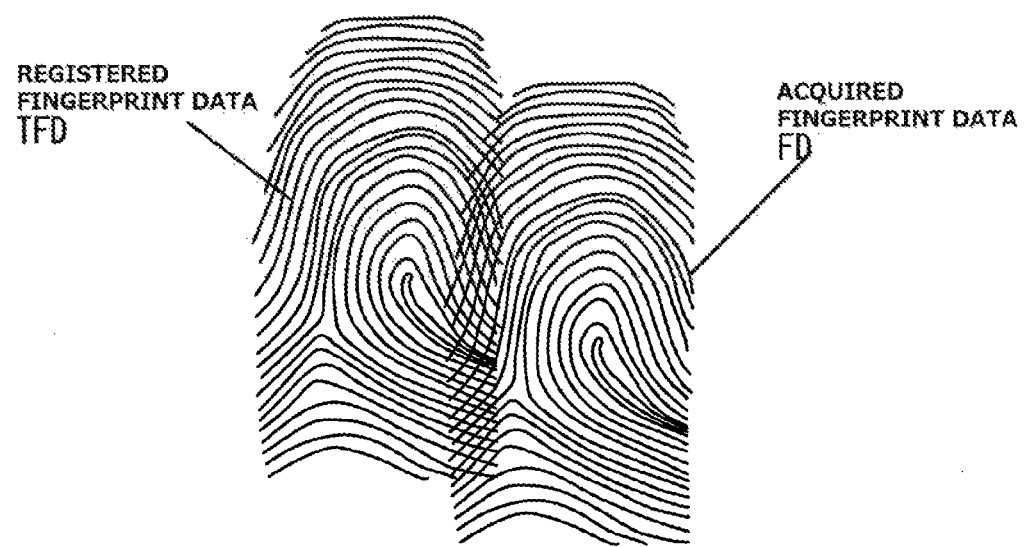
FIG. 7 is a schematic diagram showing an example of checking in the fingerprint checking process.

FIG. 6 is a flowchart of an operation of the fingerprint checking process according to this embodiment, and FIG. 7 is a schematic diagram for illustrating an example of checking in the fingerprint checking process.

As shown in FIG. 6, in the fingerprint checking process, the fingerprint data acquisition device 200 first acquires fingerprint data FD (Step S1).

Then, the fingerprint data acquisition device 200 transmits the acquired fingerprint data FD to the first index determination unit 310, and the first index determination unit 310 determines as which class, LOOP, WHORL or ARCH (see FIG. 4), the fingerprint data FD is classified (Step S2).

For example, if it is determined in the processing of Step S2 that the fingerprint data FD is classified as LOOP, the second index determination unit 320 further determines which condition, the 2A condition, the 2B condition or the 2C condition (see FIG. 5), the fingerprint data FD satisfies, based on the characteristics or features of the fingerprint data FD (Step S3).

If it is determined in the processing of Step S3 that the fingerprint data FD satisfies the 2A condition, the n-th index determination unit 331 determines whether or not the fingerprint data FD satisfies a predetermined condition (Step Sn).

If the n-th index determination unit 331 determines that the fingerprint data FD satisfies a 3A condition, the n-th index determination unit 331 passes the fingerprint data FD and the index data that specifies LOOP, the 2A condition and the 3A condition to the selected data acquisition device 500. That is, the index data is "LOOP", "2A condition" and "3A condition".

Based on the index data, the selected data acquisition device 500 acquires all the fingerprint data TFD registered in the corresponding one of the first group 401 to the (m+2)-th group 40m+2 of the registration part 400 (Step Sn+1).

Then, the selected data acquisition device 500 passes all the fingerprint data TFD registered in the predetermined group and the fingerprint data FD to be checked to the checking device 600.

As shown in FIG. 7, the checking device 600 performs pattern matching check between the fingerprint data FD to be checked and the fingerprint data TFD registered in the predetermined group (Step S21).

Although all the registered fingerprint data TFD has been described as being passed to be checking device 600 in this embodiment for the convenience of explanation, the present invention is not limited to this implementation. The fingerprint data TFD may not be passed to the checking device 600, and the checking device 600 may refer to the fingerprint data TFD registered in the group for checking.

If the checking device 600 determines in the processing of Step 21 that the fingerprint data FD to be checked does not match with any of the fingerprint data TFD registered in the predetermined group, the determination result display part 700 provides a no-match display (Step S23).

If the checking device 600 determines in the processing of Step 21 that the fingerprint data FD to be checked matches with any of the fingerprint data TFD registered in the predetermined group, the determination result display part 700 provides a match display (Step S22).

In this way, the checking device 600 performs the pattern matching process using a predetermined number of pieces of fingerprint data TFD grouped and registered based on the index data, the pattern matching process can be completed in a shorter time. Specifically, the fingerprint data FD can be checked against the dozens or, several hundreds of or several thousands of pieces of registered fingerprint data TFD in several seconds.

If the fingerprint data TFD is not grouped and registered based on the index data, the fingerprint data FD has to be checked against hundreds or tens of millions of pieces of registered fingerprint data TFD, so that the checking process takes tens of thousands of seconds. For example, the checking process takes 3 hours, and the fingerprint authentication cannot be used as an alternative to personal authentication, a card or the like.

Although the determination result display part 700 is used in the embodiment described above, the present invention is not limited to this implementation, and the determination result may be output in the form of a signal or other means.

(Automatic Configuration of Index Determination)

Next, an example of automatic configuration of the fingerprint authentication system 100 according the embodiment described above will be described in detail. In the embodiment, if several hundreds, or tens, of millions of pieces of fingerprint data TFD are registered in one group, the checking process takes a long time, which poses a serious problem.

With the fingerprint authentication system 100 according to the embodiment, automatic configuration of the first to n-th index determination device 300 and the registration part 400 occurs. In the following, automatic configuration of the first to n-th index determination device 300 and the registration part 400 will be described.

Although, in the embodiment described above, the fingerprint authentication system 100 has been described as including the first to n-th index determination device 300 (n represents an arbitrary positive integer) and having the first group to the (m+2)-th group 40m+2 (m represents an arbitrary positive integer), the numbers n and m can also be determined as shown in the example disclosed below.

Figure 8:
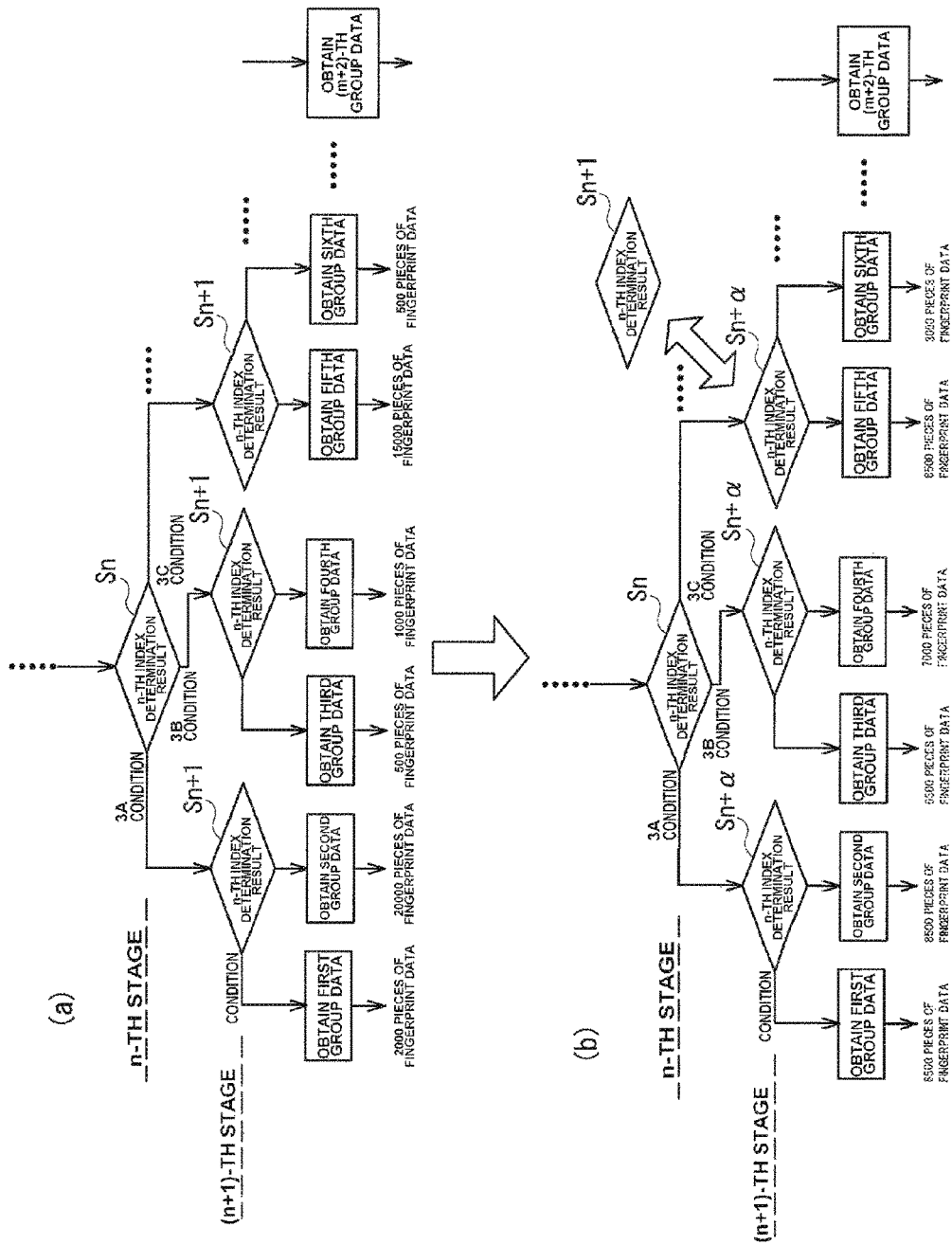
FIG. 8 are schematic diagrams for illustrating a process performed in a case where the number of pieces of fingerprint data TFD registered in any one of the groups in the registration part 400 is greater than ten thousand.
Figure 9:
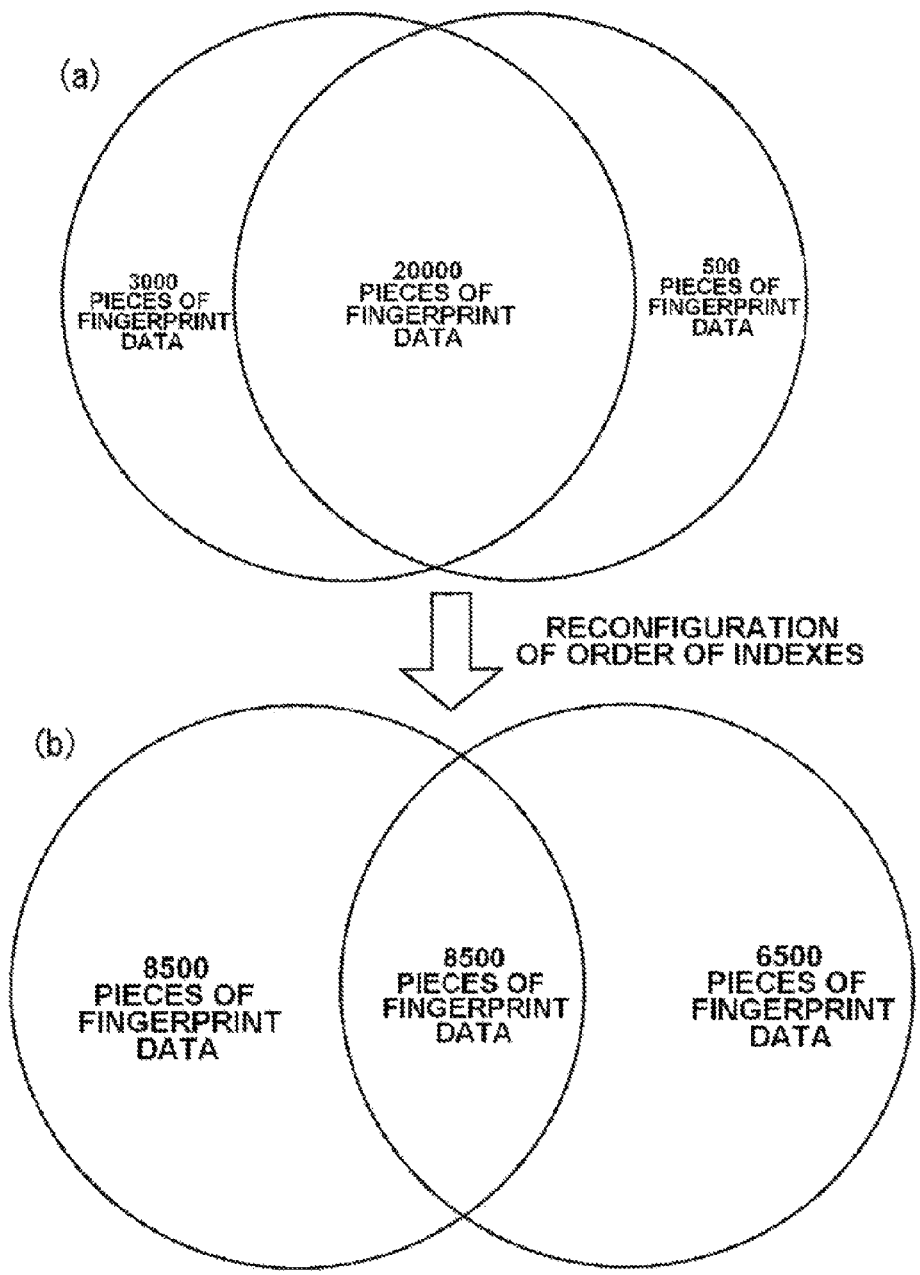
FIG. 9 are schematic diagrams for illustrating an example of the process shown in FIG. 8.
Figure 10:
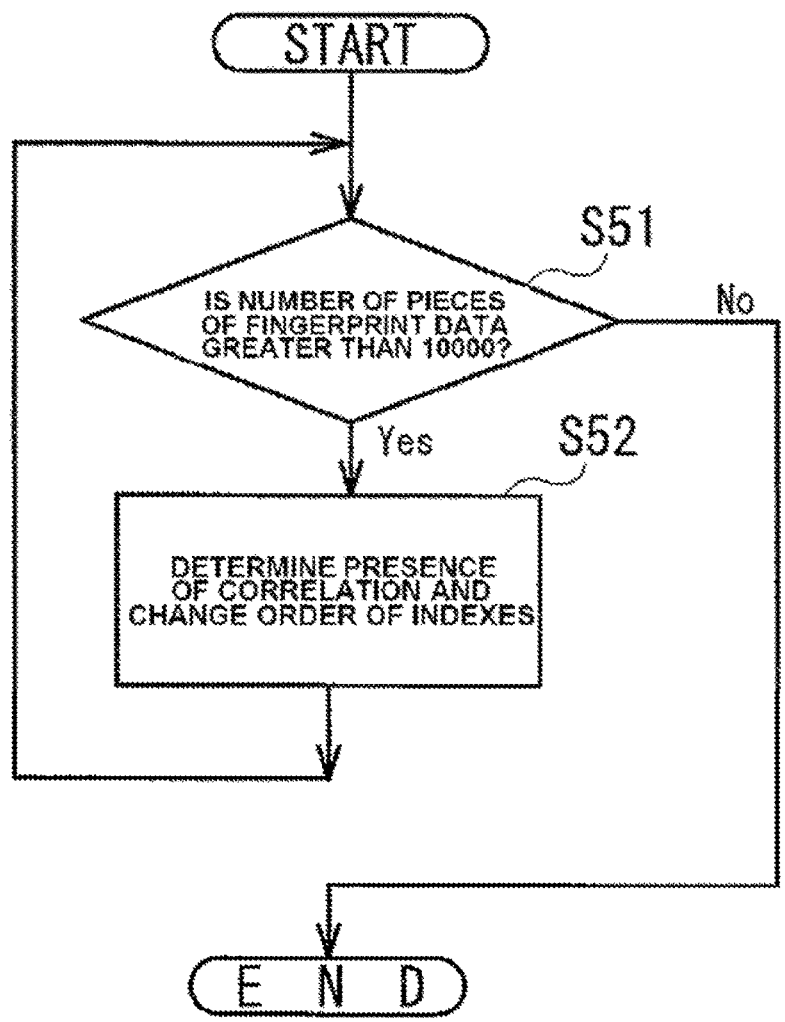
FIG. 10 is a flowchart showing an example of the process shown in FIGS. 8 and 9.

FIGS. 8 and 9 are schematic diagrams for illustrating a process performed in a case where the number of pieces of fingerprint data TFD registered in any one of the groups in the registration part 400 is greater than ten thousand. FIG. 10 is a flowchart showing an example of the process shown in FIGS. 8 and 9.

As shown in FIG. 8(*a*), in the registration part 400 of the fingerprint authentication system 100, two thousands of pieces of fingerprint data TFD are registered in the first group, twenty thousands of pieces of fingerprint data TFD are registered in the second group, five hundreds of pieces of fingerprint data TFD are registered in the third group, a thousand of pieces of fingerprint data TFD are registered in the fourth group, fifteen thousands of pieces of fingerprint data TFD are registered in the fifth group, and five hundreds of pieces of fingerprint data TFD are registered in the sixth group.

In this case, as shown in FIG. 1, the registration part 400 of the fingerprint authentication system 100 according to the embodiment determines whether the number of pieces of fingerprint data TFD registered in any of the first to (m+2)-th groups is greater than ten thousand or not (Step S51).

If the number of pieces of fingerprint data TFD registered in any of the first to (m+2)-th groups is greater than ten thousand, it is determined that there is a correlation, and the order of indexes is changed (Step S52).

The process in which fingerprint data are classified as LOOP, WHORL or ARCH illustrated in FIGS. 3 and 4 described above is just an example, and the order of indexes is not limited to that shown in the example and can be changed based on the result of machine learning. For the basic process before performing machine learning, a set of indexes and the order of the indexes are determined that provide high efficiency, high dependency and high processing speed. For example, triplet, peripheral texture information (FingerCode) or the like often takes precedence over other indexes.

(Index Correlation)

As shown in FIG. 8(*a*), of the first, second and third groups, the second group has twenty thousands of pieces of fingerprint data registered therein. Therefore, the result of the processing of Step S51 is Yes, so that it is determined that there is a correlation, and the order of indexes is changed. In the example shown in FIG. 8, an n-th index determination result Sn+1 is replaced with an n-th index determination result Sn+α.

As a result, as shown in FIG. 8(*b*), the number of pieces of fingerprint data registered in the second group can be reduced to 8500.

The number of pieces of fingerprint data registered in the first group is 8500, and the number of pieces of fingerprint data registered in the third group is 6500. Since the numbers of pieces of fingerprint data registered in the groups are all equal to or less than ten thousand, the process shown in FIG. 10 ends.

An index correlation will be described with reference to FIGS. 9(*a*) and 9(*b*). As shown in FIG. 9(*a*), if the n-th index determination result Sn and the n-th index determination result Sn+1 are used, the pieces of fingerprint data are classified into three groups containing 3000 pieces, 20000 pieces and 500 pieces.

On the other hand, as shown in FIG. 9(*b*), if the n-th index determination result Sn and the n-th index determination result Sn+α are used, the pieces of fingerprint data are classified into three groups containing 8500 pieces, 8500 pieces and 6500 pieces.

As can be seen, the n-th index determination result Sn and the n-th index determination result Sn+1 are highly correlated, and therefore, the pieces of fingerprint data cannot be classified into groups of approximately equal numbers of pieces of data. On the other hand, the n-th index determination result Sn and the n-th index determination result Sn+α are less correlated, and therefore, the pieces of fingerprint data can advantageously be classified into groups of approximately equal numbers of pieces of data.

The registration part 400 repeats this process of changing the order of indexes until the pieces of fingerprint data are classified into groups of approximately equal numbers of pieces of data.

Figure 11:
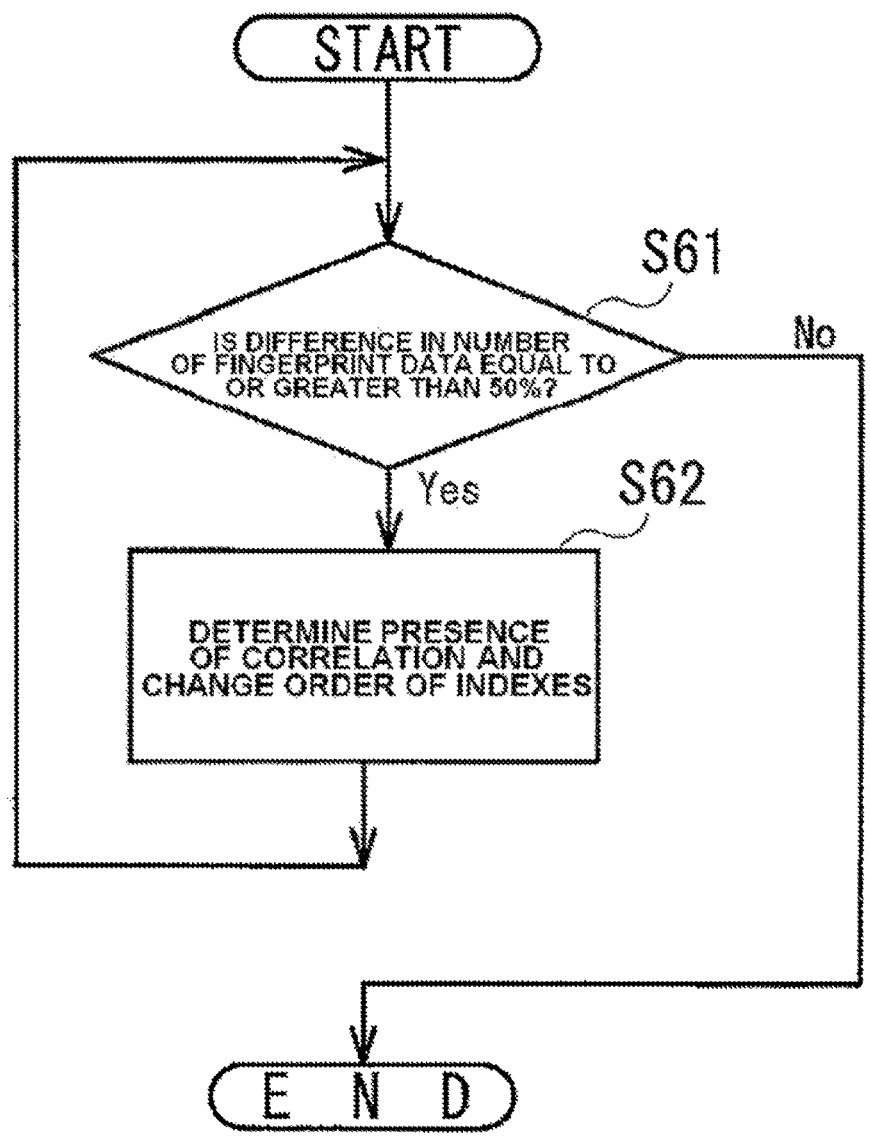
FIG. 11 is a flowchart showing another example of the process shown in FIG. 10.

Next, FIG. 11 is a flowchart showing another example of the process shown in FIG. 10.

As shown in FIG. 11, the registration part 400 determines whether or not the difference between the numbers of pieces of fingerprint data registered in adjacent groups is equal to or greater than 50% of the number of pieces of fingerprint data registered in one of the groups, even if the number of pieces of fingerprint data registered in each of the groups is not greater than ten thousand (Step S61).

If the difference between the numbers of pieces of fingerprint data registered in adjacent groups is equal to or greater than 50% of the number of pieces of fingerprint data registered in one of the groups, it is determined that there is a correlation, and the order of indexes is changed (Step S62).

In this way, the numbers of pieces of fingerprint data registered in adjacent groups can be reduced, and an approximately equal number of pieces of fingerprint data can be registered in each group.

(Stage Addition Process)

Figure 12:
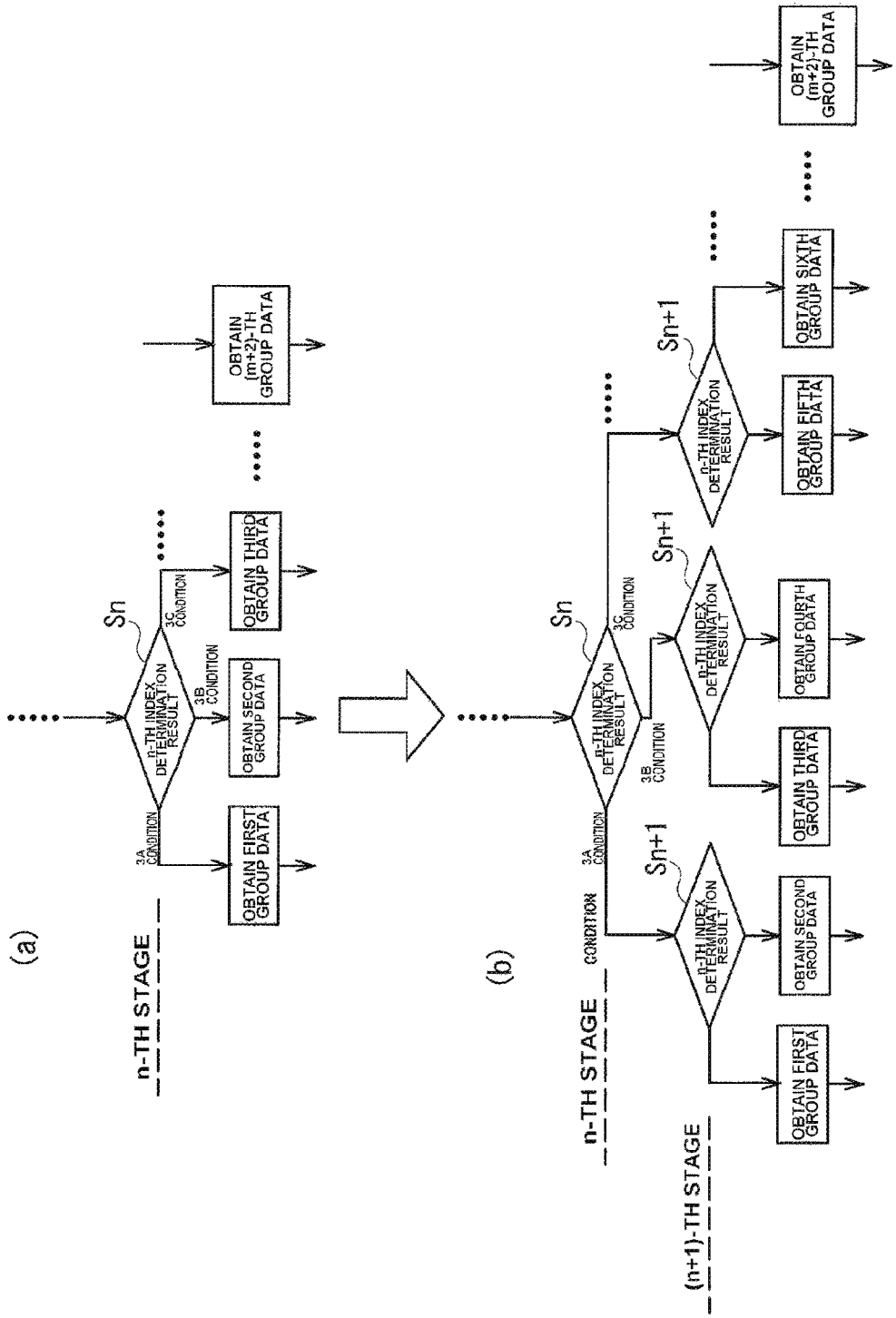
FIG. 12 are schematic diagrams showing an example of a stage addition process.
Figure 13:
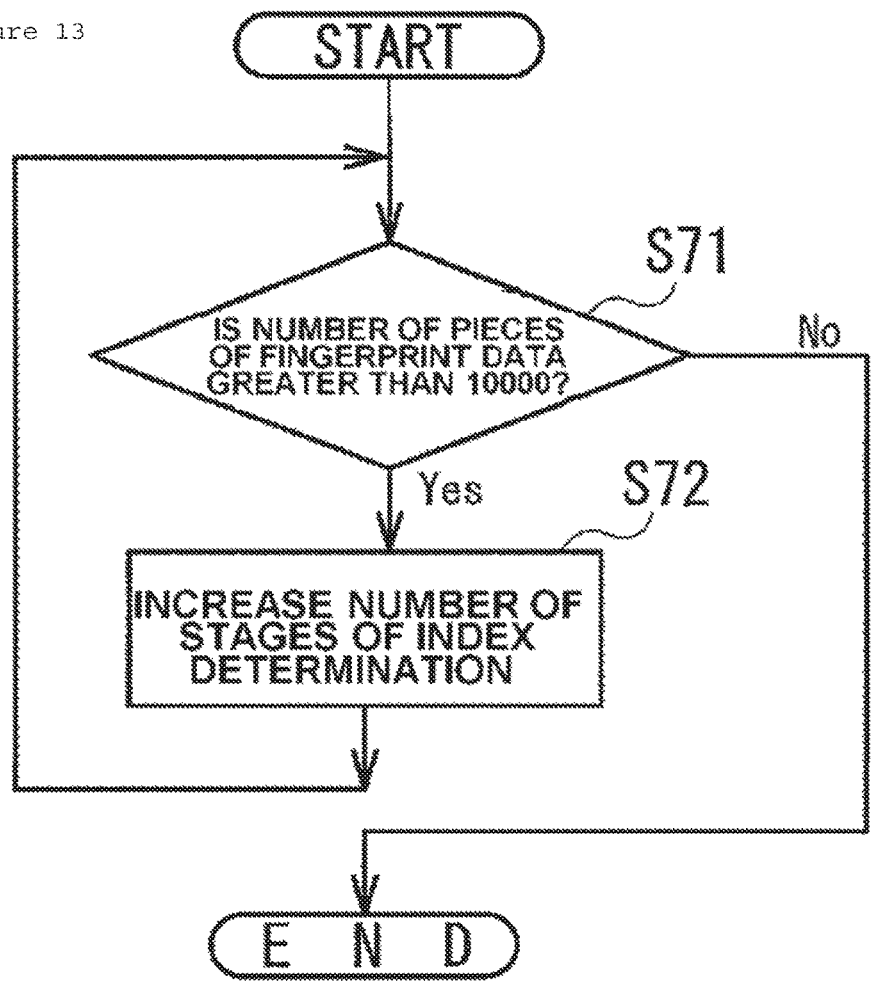
FIG. 13 is a flowchart showing the example of the stage addition process.

Next, FIG. 12 are schematic diagrams showing an example of a stage addition process, and FIG. 13 is a flowchart showing the example of the stage addition process.

The stage addition process is performed after the processes in FIGS. 8 to 11 are performed if the number of pieces of fingerprint data registered in any one of the groups is greater than ten thousand.

The stage addition process can also be performed before the processes shown in FIGS. 8 to 11 are performed.

As shown in FIG. 13, the fingerprint authentication system 100 determines whether or not the number of pieces of fingerprint data TFD registered in any one of the groups in the registration part 400 is greater than ten thousand (Step S71). As shown in FIG. 13, if the number of pieces of fingerprint data registered in any of the groups is greater than ten thousand, the fingerprint authentication system 100 increases the number n of the first to n-th index determination device (Step S72).

More specifically, the first to n-th index determination units configured in the first to n-th stages are reconfigured into first to (n+1)-th index determination units configured in first to (n+1)-th stages.

As a result, the groups can be increased to first to (m+2L)-th group 40m+2L (L represents an arbitrary positive integer). After that, it is determined again whether or not the number of pieces of fingerprint data TFD registered in any of the groups in the registration part 400 is greater than ten thousand (Step S71).

As described above, the groups can be divided into more groups from the first group to the (m+2L)-th group 40m+2L (L represents an arbitrary positive integer).

As a result, the number of pieces of fingerprint data TFD registered in each of the first group to the (m+2L)-th group 40m+2L can be reduced to ten thousand or less, and therefore, the checking device 600 can perform checking in a shorter time.

Although, in the example described above, the number of pieces of fingerprint data TFD registered in each of the first group to the (m+2L)-th group 40m+2L is reduced to ten thousand or less, the present invention is not limited to this implementation. The first to n-th index determination units can be automatically increased to the first to (n+1)-th index determination units so as to reduce the number of pieces of fingerprint data TFD registered in each group to any number, such as two thousand or less, three thousand or less, four thousand or less, five thousand or less, six thousand or less, seven thousand or less, eight thousand or less, or nine thousand or less.

Although, in the example described above, the number of first to n-th index determination units is increased according to the number of pieces of fingerprint data TFD, the present invention is not limited to this implementation. The number of first to n-th index determination units may be increased when the duration of checking performed by the checking device 600 exceeds five seconds.

Although the case where the number of index determination units is increased when the checking duration exceeds five seconds has been described above, the present invention is not limited to this implementation. The first to n-th index determination units can be automatically increased to the first to (n+1)-th index determination units at any time, such as when the checking duration exceeds one seconds, two seconds, three seconds, four seconds, seven seconds, eight seconds, nine seconds, or ten seconds.

Next, a process of increasing the first to n-th index determination units to the first to (n+1)-th index determination units will be described in detail.

For example, it is assumed that an index determination condition for the n-th index determination unit is whether or not the distance between the hair line C1 and the bar line C5 of the minutiae in the fingerprint data TFD is equal to or greater than 0.5 mm.

In this case, if an (n+1)-th index determination condition is to be provided following the affirmative result (YES) of the determination for the n-th index determination condition, an index determination to determine whether or not the distance between the hair line C1 and the bar line C5 of the minutiae in the fingerprint data TFD is equal to or greater than 0.7 mm is automatically added.

If an (n+1)-th index determination condition is to be provided following the negative result (NO) of the determination for the n-th index determination condition, an index determination to determine whether or not the distance between the hair line C1 and the bar line C5 of the minutiae in the fingerprint data TFD is equal to or greater than 0.3 mm is automatically added.

In this way, the pieces of fingerprint data TFD registered in two groups based on whether or not the distance between the two minutiae is equal to or greater than 0.5 mm can be further divided into four groups based on whether the distance between the two minutiae is smaller than 0.3 mm, equal to or greater than 0.3 mm and smaller than 0.5 mm, equal to or greater than 0.5 mm and smaller than 0.7 mm, or equal to or greater than 0.7 mm.

Although two groups are further divided into four groups in the embodiment, the present invention is not limited to this implementation. The (n+1)-th index determination can also be provided for only a group that contains a larger number of pieces of fingerprint data TFD. That is, in the example described above, two groups can also be divided into three groups.

(Example of Index Condition)

Next, specific examples of the condition for index data used in the embodiment described above will be described.

For example, the registration part 400 extracts a characteristic quantity for precise authentication from the fingerprint data TFD, that is, the fingerprint image, and sets an index condition. Specifically, a characteristic quantity of the minutia, such as the position, the type or the vector of the minutia, is extracted from the fingerprint data TFD.

A characteristic quantity that can be indexed is then extracted from the fingerprint data TFD. The extracted characteristic quantity that can be indexed is used as a condition for index data.

Specifically, the characteristic quantity that can be indexed may be the shape of a triplet formed by minutiae, the number of, the type of or the positional relationship between singular points, Poincare index, peripheral texture information (FingerCode), the number and/or shape of lakes, independent ridges, islands, spurs or crossovers, frequency analysis of an orientation image of the entire fingerprint, the configuration of the orientation image of the entire fingerprint, the number of ridges in the cross section of a slice of the fingerprint and the result of frequency analysis of the ridges as a waveform, the line formed by a minutia and a singular point, the number of ridges in the cross section of the slice of the fingerprint taken along the line and the result of frequency analysis of the ridges as a waveform, the presence or shape of a crease, or other fingerprint shape information.

The characteristic quantity that can be indexed described above is adjusted so that the characteristic quantity can be indexed if two fingerprints can be compared based on computation of the similarity of the characteristic quantity without modifying the characteristic quantity, that is, without the need of a normalization processing, such as alignment.

That is, a certain margin can be provided, and the margin can be changed from a wide width to a narrow width.

For example, high-speed authentication of one fingerprint data FD against registered fingerprint data TFD is achieved by using the characteristic quantity described above. As described above, the registered fingerprint data TFD is coupled to an index (characteristic quantity). Thus, a characteristic quantity is extracted from the one fingerprint data, and peripheral candidates are extracted from the registered fingerprint data TFD.

The number of candidates that should be extracted for each characteristic quantity is preferably determined based on the value distribution of the characteristic quantity or the matching precision.

The fingerprint authentication system 100 determines the combination of the many characteristic quantities described above by machine learning, and performs a feedback processing to improve precision. To determine the combination of the characteristic quantities, a principal component analysis or an independent component analysis is used to take into consideration whether the characteristic quantities are dependent ones or independent ones. By performing the determination processing by machine learning, a combination pattern of significant characteristic quantities can be determined in a massive volume of data in a short time that would be conventionally impossible to achieve. A discrimination model for the fingerprint data FD may be used in order to discriminate between fingerprint data FD that require many candidates for index determination and fingerprint data FD that require less candidates for index determination.

The fingerprint authentication system 100 creates a combination of the fingerprint data FD and the characteristic quantity and learns the index classification itself by using a generation model. That is, the authentication precision can be improved by including a feedback processing.

Furthermore, for a given candidate of the fingerprint data FD, high precision one-to-one authentication using the position, the type or the vector of a minutia may be performed.

Furthermore, the components of the fingerprint authentication system 100 or the components of the fingerprint registration apparatus 900 do not have to be installed at the same location and may be interconnected by the Internet, a cloud or the like.

As an example of the condition for index data, the following information is used. For example, information on a triplet formed by connecting minutiae may be a combination of angles between three lines at a branch point classified into several patterns, various kinds of information on a figure formed by three lines at a branch point, whether the descending order of magnitude of the three angles of the triplet is a clockwise order or a counterclockwise order or the magnitudes of the three angles of the triplet, the lengths of the sides of the triplet, the degree of deviation of the directions of two sides passing through each minutia from the direction of the orientation field, the area of the triplet, the number of the ridges that intersect with each side of the triplet, the result of frequency analysis of the frequency of intersections of ridges with each side of the triplet, a rotation of the triplet, or an arbitrary combination of any of the index conditions described above.

As an example of the condition for index data, the following information is used. For example, information on a quadruplet formed by connecting minutiae may be a combination of angles between three lines at a branch point classified into ten patterns, various kinds of information on a figure formed by three lines at a branch point, a pattern of arrangement of the four angles in descending order of magnitude, the position of the point of intersection between the two diagonals and the angles between the two diagonals at the point of intersection, the angles of the four corners, the lengths of the four sides, the degree of deviation of the directions of two sides and the diagonal passing through each minutia from the direction of the orientation field, the area of the quadruplet, a rotation of the quadruplet, or an arbitrary combination of any of the index conditions described above.

As an example of the condition for index data, the following information is used. Information on a crease may be the thickness or length of the crease, the number of the ridges that intersect with the crease, the result of frequency analysis of the frequency of intersections of ridges with the crease, or an arbitrary combination of any of the index conditions described above.

As an example of the condition for index data, the following information is used. That is, information on a singular point and on a use of the singular point, the number of singular points, the types of singular points (such as core or delta) or the like, the distance between the core and a delta, the number of ridges that intersect with the line segment connecting the core and the delta, the result of frequency analysis of the frequency of intersections of ridges with the straight line connecting the core and the delta, FingerCode (such as the direction or density of ridges in any of 8 by 8 sub-regions of a peripheral region of a singular point), or an arbitrary combination of any of the index conditions described above can be used. As an alternative, the peripheral region of a singular point can be divided into any number of sub-regions, and the direction and density of ridges in any of the sub-regions may be used as an index condition.

As an example of the condition for index data, the following information is used. Information on the entire fingerprint may be the number of triplets and information on the triplets, the number of triplets resulting from 0-n order Delaunay triangulation of the fingerprint and information on the triplets, the number of quadruplets and information on the quadruplets, the number of minutiae and the types of the minutiae (end point or branch point), the number of sweat glands, a hashed SIFT characteristic quantity, a ridge line subjected to two-dimensional Fourier transform, a template of the orientation field, or an arbitrary combination of any of the index conditions described above.

Although the checking device 600 has been described as performing a pattern matching process in this embodiment, the present invention is not limited to this implementation, and a minutia process, a frequency analysis process, a hybrid fingerprint authentication process or the like can also be used.

As described above, the fingerprint authentication system 100 according to the present invention provides a plurality of stages (n+1 stages) of index data (indexes). As a result, the fingerprint data FD can be efficiently grouped and registered in the registration part 400 as the fingerprint data TFD.

Furthermore, the checking device 600 checks the fingerprint data to be checked against the fingerprint data TFD previously grouped through the plurality of stages (n+1 stages) and registered in the registration part 400 based on the index data, and therefore, the checking device 600 can check the fingerprint data FD in a shorter time.

In particular, since the n+1 stages of indexes are provided (n represents a positive integer), even if there are hundreds or tens of millions of pieces of fingerprint data TFD, the checking process requires only thousands of pieces of fingerprint data TFD grouped according to the index data, so that the time required for the checking process can be reduced.

Since the index data is based on the characteristics or features of the fingerprint data FD, the fingerprint data FD can be grouped according to the characteristics or features thereof. In particular, compared with a case where all the registered fingerprint data TFD is used for checking or the like, the access speed can be increased, and the process load can be reduced.

Furthermore, the index data indicates general classification as LOOP, WHORL or ARCH or the number of lines, the interval between lines or the angle of a line concerning a short line, a bar line, a hair line or an island line and therefore can be advantageously used.

Furthermore, the index data can indicate classification as the branch point, the end point, the point, the start point or the joint point and therefore can be advantageously used.

According to the present invention, the index data corresponds to an "index", the fingerprint data FD and the fingerprint data TFD correspond to "fingerprint data", the registration part 400 corresponds to a "registration part", the fingerprint authentication system 100 corresponds to a "fingerprint authentication system", the checking device 600 corresponds to a "checking part", the first to (m+2)-th groups correspond to a "fingerprint data group", the n-th index determination units 331 to 33P correspond to a "final stage of a plurality of stages", and the flowcharts correspond to a "fingerprint authentication program" or a "fingerprint authentication method".

Although a preferred embodiment of the present invention has been described above, the present invention is not limited to the specific embodiment. Those skilled in the art will understand that various other embodiments are possible without departing from the spirit and scope of the present invention. Although effects and advantages of the configuration according to the embodiment have been described in the embodiment, these effects and advantages are only examples and are not intended to limit the present invention.

The invention claimed is:

1. A fingerprint authentication system, comprising:
a plurality of stages of indexes; and
a registration part in which fingerprint data is registered according to the indexes,
wherein the registration part creates a plurality of fingerprint data groups according to the indexes and, if the number of pieces of fingerprint data registered in any individual one of the plurality of fingerprint data groups is greater than a predetermined number, changes the stages of indexes to keep the number of pieces of fingerprint data registered in each of the plurality of fingerprint data groups equal to or less than the predetermined number, and
wherein, when the registration part changes the stages of indexes, the registration part reconfigures the order of indexes so as to reduce a correlation between an index in a higher stage and an index in a lower stage.

2. The fingerprint authentication system according to claim 1, wherein, when the registration part changes the stages of indexes, the registration part changes a threshold of a condition for the indexes.

3. The fingerprint authentication system according to claim 1, wherein, when the registration part changes the stages of indexes, the registration part increases the number of the stages of indexes and creates, as an index, a condition that equally divides a condition for an index in a higher stage.

4. The fingerprint authentication system according claim 1, wherein, when the registration part changes the stages of indexes, the registration part increases the number of the stages of indexes and creates, as an index, a condition that equally divides the number of pieces of fingerprint data in a relevant fingerprint data group based on a deviation of the relevant fingerprint data group.

5. The fingerprint authentication system according to claim 1, wherein the indexes are based on a characteristic or feature of the fingerprint data.

6. The fingerprint authentication system according to claim 1, wherein the index includes a pattern of ridges and grooves of the fingerprint data.

7. The fingerprint authentication system according to claim 1, wherein the index includes at least any of the number of lines, the interval between lines or the angle of a line concerning at least any of a short line, a bar line, a hair line and an island line of the fingerprint data.

8. The fingerprint authentication system according to claim 1, wherein the index includes at least any of a branch point, an end point, a point, a start point and a joint point of the fingerprint data.

9. A fingerprint authentication system, comprising:
a plurality of stages of indexes;
a registration part in which fingerprint data is registered according to the indexes; and
a checking part that checks the fingerprint data based on the indexes,
wherein the registration part creates a plurality of fingerprint data groups according to the indexes and, if the number of pieces of fingerprint data registered in any individual one of the plurality of fingerprint data groups is greater than a predetermined number, changes the stages of indexes to keep the number of pieces of fingerprint data registered in each of the plurality of fingerprint data groups equal to or less than the predetermined number, and
wherein, when the registration part changes the stages of indexes, the registration part reconfigures the order of indexes so as to reduce a correlation between an index in a higher stage and an index in a lower stage.

10. The fingerprint authentication system according to claim 9, wherein the checking part performs checking of the fingerprint data in a final stage of the plurality of stages in at least any of a frequency analysis process, a hybrid process, a minutia process and a pattern matching process.

11. A non-transitory computer readable medium on which is recorded a fingerprint authentication program for causing a computer to execute the following processing steps, comprising:
an indexing processing configured in a plurality of stages; and a registration processing of registering fingerprint data according to the indexing processing, wherein the registration processing creates a plurality of fingerprint data groups according to the indexing processing and, if the number of pieces of fingerprint data registered in any individual one of the plurality of fingerprint data groups is greater than a predetermined number, changes the stages of the indexing processing to keep the number of pieces of fingerprint data registered in each of the plurality of fingerprint data groups equal to or less than the predetermined number, and wherein, when the registration processing changes the stages of indexes, the registration processing reconfigures the order of indexes so as to reduce a correlation between an index in a higher stage and an index in a lower stage.

12. A non-transitory computer readable medium on which is recorded a fingerprint authentication program for causing a computer to execute the following processing steps, comprising:

an indexing processing configured in a plurality of stages;

a registration processing of registering fingerprint data according to the indexing processing; and a checking processing of checking the fingerprint data based on the indexing processing, wherein the registration processing creates a plurality of fingerprint data groups according to the indexing processing and, if the number of pieces of fingerprint data registered in any individual one of the plurality of fingerprint data groups is greater than a predetermined number, increases the number of the stages of the indexing processing to keep the number of pieces of fingerprint data registered in each of the plurality of fingerprint data groups equal to or less than the predetermined number, and wherein, when the registration processing changes the stages of indexes, the registration processing reconfigures the order of indexes so as to reduce a correlation between an index in a higher stage and an index in a lower stage.

13. A fingerprint authentication method, comprising:

an indexing step configured in a plurality of stages; and a registration step of registering fingerprint data according to the indexing step, wherein the registration step creates a plurality of fingerprint data groups according to the indexing step and, if the number of pieces of fingerprint data registered in any individual one of the plurality of fingerprint data groups is greater than a predetermined number, changes the stages of the indexing step to keep the number of pieces of fingerprint data registered in each of the plurality of fingerprint data groups equal to or less than the predetermined number, and wherein, when the registration step changes the stages of indexes, the registration step reconfigures the order of indexes so as to reduce a correlation between an index in a higher stage and an index in a lower stage.

14. A fingerprint authentication method, comprising:

an indexing step configured in a plurality of stages;

a registration step of registering fingerprint data according to the indexing step; and a checking step of checking the fingerprint data based on the indexing step, wherein the registration step creates a plurality of fingerprint data groups according to the indexing step and, if the number of pieces of fingerprint data registered in any individual one of the plurality of fingerprint data groups is greater than a predetermined number, changes the stages of the indexing step to keep the number of pieces of fingerprint data registered in each of the plurality of fingerprint data groups equal to or less than the predetermined number, and wherein, when the registration step changes the stages of indexes, the registration step reconfigures the order of indexes so as to reduce a correlation between an index in a higher stage and an index in a lower stage.

\* \* \* \* \*